US010585244B2

(12) United States Patent
Mori et al.

(10) Patent No.: US 10,585,244 B2
(45) Date of Patent: Mar. 10, 2020

(54) OPTICAL FIBER HOLDING MEMBER AND FUSION MACHINE

(71) Applicant: FURUKAWA ELECTRIC CO., LTD., Tokyo (JP)

(72) Inventors: Kenji Mori, Tokyo (JP); Tomohiro Akiyama, Tokyo (JP); Takashi Kuroki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 183 days.

(21) Appl. No.: 15/827,081

(22) Filed: Nov. 30, 2017

(65) Prior Publication Data

US 2018/0088279 A1 Mar. 29, 2018

Related U.S. Application Data

(63) Continuation of application No. PCT/JP2016/087923, filed on Dec. 20, 2016.

(30) Foreign Application Priority Data

Jan. 4, 2016 (JP) .................................. 2016-000075
Aug. 18, 2016 (JP) .................................. 2016-160622

(51) Int. Cl.
*G02B 6/255* (2006.01)
*G02B 6/36* (2006.01)

(52) U.S. Cl.
CPC ......... *G02B 6/2555* (2013.01); *G02B 6/2553* (2013.01); *G02B 6/3616* (2013.01)

(58) Field of Classification Search
CPC ... G02B 6/2555; G02B 6/2553; G02B 6/3616
See application file for complete search history.

(56) References Cited

FOREIGN PATENT DOCUMENTS

JP S59-136602 U 9/1984
JP H9-197163 A 7/1997
(Continued)

OTHER PUBLICATIONS

International Search Report issued in PCT Patent Application No. PCT/JP2016/087923 dated Mar. 21, 2017.

*Primary Examiner* — Queenie S Dehghan
(74) *Attorney, Agent, or Firm* — Marshall, Gerstein & Borun LLP

(57) ABSTRACT

An optical fiber placement surface has formed thereon width-directional position restricting sections for partially restricting the position of an optical fiber ribbon in a width direction perpendicular to the axial direction of the optical fiber ribbon. A portion other than the width-directional position restricting sections serves as a width-directional position non-restricting section that does not restrict the position of the optical fiber ribbon in the direction perpendicular to the axial direction of the optical fiber ribbon. A pressing member is formed at a portion corresponding to the width-directional position non-restricting section. On the other hand, the pressing member is not formed at positions corresponding to the width-directional positional restricting sections. Thus, the optical fiber ribbon is not pressed at the width-directional positional restricting sections. Portions at which the optical fiber ribbon is not pressed by the pressing member are defined as non-main pressing sections.

8 Claims, 15 Drawing Sheets

(56) References Cited

FOREIGN PATENT DOCUMENTS

| | | | |
|---|---|---|---|
| JP | 2003-177268 A | 6/2003 | |
| JP | 2007-057698 A | 3/2007 | |
| JP | 2007-171824 A | 7/2007 | |
| JP | 2007-171825 A | 7/2007 | |
| JP | 2007-298705 A | 11/2007 | |
| JP | 2011128544 A * | 6/2011 | ........... G02B 6/2553 |

* cited by examiner

OPTICAL FIBER HOLDING MEMBER AND FUSION MACHINE

TECHNICAL FIELD

This disclosure relates to an optical fiber holding member that can hold a plurality of optical fibers collectively, and the like.

BACKGROUND

In optical fiber cables for high-speed mass data transmission, optical fiber ribbons, in which a plurality of optical fiber strands are arranged in parallel and bonded together, are used to simplify cable packaging and operations.

When splicing or the like of such optical fiber ribbons, an optical fiber holding member is used for holding the optical fiber. In particular, for splicing or the like each of the optical fibers in the optical fiber ribbon collectively, it is required to collectively hold a plurality of the optical fibers.

As such an optical fiber holding member, Japanese Unexamined Patent Application Publication No. 2007-57698 (JP-A-2007-57698) discloses an optical fiber holding member having a groove formed in a longitudinal direction of a main body thereof, in which an optical fiber is placed inside the groove and, when a lid is closed, a protruded portion disposed on an inner surface of the lid presses and holds the optical fiber.

FIG. 13A is a plan view showing a conventional optical fiber holding member 100. The optical fiber holding member 100 mainly includes a main body section 101 and a lid section 103. An upper surface of the main body section 101 has a groove 105 formed in a longitudinal direction thereof.

The main body section 101 is provided with a lid section 103 that can be freely opened and closed by means of a hinge mechanism. A pressing member 107 is provided on an inner surface side of the lid 103 (a surface facing the main body section 101). The pressing member 107 is made of resin, for example. The pressing member 107 is disposed at a position in such a manner that the pressing member 107 covers over the groove 105 when the lid section 103 is closed.

The lid section 103 is made of iron, for example. A magnet 109 is disposed at a position facing the lid section 103 when the lid section 103 is closed. Thus, when the lid section 103 is closed, the magnet attracts the lid section 103 and the lid section 103 can be kept closed. At this time, since the lid section 103 is attracted to the main body section 101, the pressing member 107 is pressed against the main body section 101.

FIG. 13B is a drawing showing the optical fiber holding member 100 with an optical fiber ribbon 111 disposed therein. The optical fiber ribbon 111 includes a plurality of optical fibers provided side by side and unified. A width of the groove 105 corresponds to a width of the optical fiber ribbon 111 used. Thus, the groove 105 determines the position of the optical fiber ribbon 111 in its width direction.

FIG. 14A is a plan view showing a state in which the lid section 103 is closed and FIG. 14B is a cross section of X section taken along Y-Y line in FIG. 14A. As mentioned above, the optical fiber ribbon 111 is disposed in the groove 105. Here, the depth of the groove 105 is less than the thickness of the optical fiber ribbon 111 (an outer diameter of the optical fiber forming the optical fiber ribbon 111). Thus, some parts of the optical fiber ribbon 111 protrude above the groove 105.

Also, as mentioned above, the pressing member 107 is disposed over the groove 105 and is pressed against the main body section 101 side. Thus, the pressing member 107 presses the optical fiber ribbon 111. That is, the optical fiber holding member 100 holds the optical fiber ribbon 111.

With the optical fiber ribbon 111 held in this way, it is possible to prevent shifting of the optical fiber ribbon 111 in its axial direction with respect to the optical fiber holding member 100. Thus, it is easy to perform operations such as cutting, coat peeling, and splicing optical fiber ribbons, for example.

However, in recent years, optical fiber ribbons in which optical fibers arranged side by side are bonded intermittently in its longitudinal direction have been in use (JP-A-2007-279226, for example). Such intermittent bonding of optical fibers is characterized in improved line concentration density, reduced transmission loss due to bending, simplified procedure for turning into single cores, and the like.

In such optical fiber ribbons, adjacent optical fibers do not fully tied up with each other and the optical fibers can be partially separated from each other. Thus, if the optical fiber ribbon 111 mentioned above is an intermittently bonded ribbon, then the optical fibers may spread out in its width direction.

FIG. 15 is a drawing showing a state in which some of the optical fibers ride over the groove 105 when the optical fiber ribbon 111 as above is used and the optical fibers spread in the width direction. If some of the optical fibers are pushed out of the groove 105 in this way, it is impossible for the pressing member 107 to keep down all the optical fibers uniformly with certainty and to hold the optical fiber ribbon 111 sufficiently. Also, since only the optical fiber riding over the groove is pressed strongly, there is a possibility that the optical fiber may break or the like.

To counter this problem, there is a method to prevent riding over of the optical fiber by increasing a depth of the groove 105. However, if the depth of the groove 105 is increased, the protrusion margin of the optical fiber ribbon 111 above the groove 105 would disappear and it would be impossible for the pressing member 107 to apply sufficient pressing force to the optical fiber ribbon.

SUMMARY OF THE DISCLOSURE

The presently described embodiments were made in view of such problems. Its object is to provide an optical fiber holding member that can hold an optical fiber ribbon with certainty, and the like.

To achieve the above object, a first embodiment is an optical fiber holding member including a main body section on which an optical fiber is to be disposed and a lid section that can be opened or closed to the main body section. The main body section includes, on an optical fiber placement surface thereof, a width-directional position restricting section that is parallel to the optical fiber placement surface and restricts a position of the optical fiber in a direction perpendicular to an axial direction thereof, and a width-directional position non-restricting section that is parallel to the optical fiber placement surface with a wider width than that of the width-directional position restricting section and does not restrict the position of the optical fiber in the direction perpendicular to the axial direction thereof. A main pressing section is formed with a pressing member for pressing the optical fiber. The pressing member is disposed on an inner surface of the lid section only at a position facing the width-directional position non-restricting section.

In this case, a non-pressing section where the optical fiber is not pressed may be formed on an inner surface of the lid section at a position facing the width-directional position restricting section.

A non-main pressing section where the optical fiber is pressed with less pressing force than the pressing force exerted by the pressing member may be formed on an inner surface of the lid section at a position facing the width-directional position restricting section.

Also, the first embodiment may be an optical fiber holding member including a main body section on which an optical fiber is to be disposed and a lid section that can be opened or closed to the main body section. The main body section includes, on an optical fiber placement surface thereof, a width-directional position restricting section that is parallel to the optical fiber placement surface and restricts a position of the optical fiber in a direction perpendicular to an axial direction thereof, and a width-directional position non-restricting section that is parallel to the optical fiber placement surface with a wider width than that of the width-directional position restricting section and does not restrict the position of the optical fiber in the direction perpendicular to the axial direction thereof. A pressing member is formed as a unified body in the proximity of a front end of the lid section such that the pressing member can simultaneously press a front-end width-directional position restricting section, which is the width-directional position restricting section in the proximity of a front end of the main body section, and the width-directional position non-restricting section at the rear of the front-end width-directional position restricting section. A main pressing section is formed with the pressing member for pressing the optical fiber. The pressing member is disposed on an inner surface of the lid section only at a position facing the width-directional position non-restricting section other than the front-end width-directional position restricting section.

In this case, a height of the front-end width-directional position restricting section may be higher than heights of the other width-directional position restricting sections and a cutout for avoiding interference with the front-end width-directional position restricting section may be formed at a position of the lid section facing the front-end width-directional position restricting section.

It is preferable that the width-directional position restricting sections are formed at least in the proximity of the front and the rear ends of the main body section.

The main pressing section of the pressing member may be divided into a plurality of segments in the axial direction of the optical fiber.

A plurality of the lid sections may be disposed and a temporarily pressing member that exerts smaller pressing force than the pressing member may be disposed on at least one of the lid sections.

With the lid section being closed, heights of the width-directional position restricting sections above the optical fiber placement surface are preferably higher than that of a gap between the pressing member and the optical fiber placement surface.

A part of the width-directional position restricting section may be a groove that is formed along a longitudinal direction of the main body section and the ratio of a depth of the groove to a height of the optical fiber may be 0.7 or more.

A second embodiment is a fusion machine including the optical fiber holding member according to the first embodiment and a pair of electrode rods that are provided between a pair of the optical fiber holding members. Optical fibers held in the optical fiber holding members can be fusion spliced by generating arc between the pair of the electrode rods.

The present embodiments can provide an optical fiber holding member that can hold an optical fiber ribbon with certainty, and the like.

BRIEF DESCRIPTION OF DRAWINGS

FIG. 5 is a perspective view showing an optical fiber holding member 1a.

DETAILED DESCRIPTION

Figure 1:
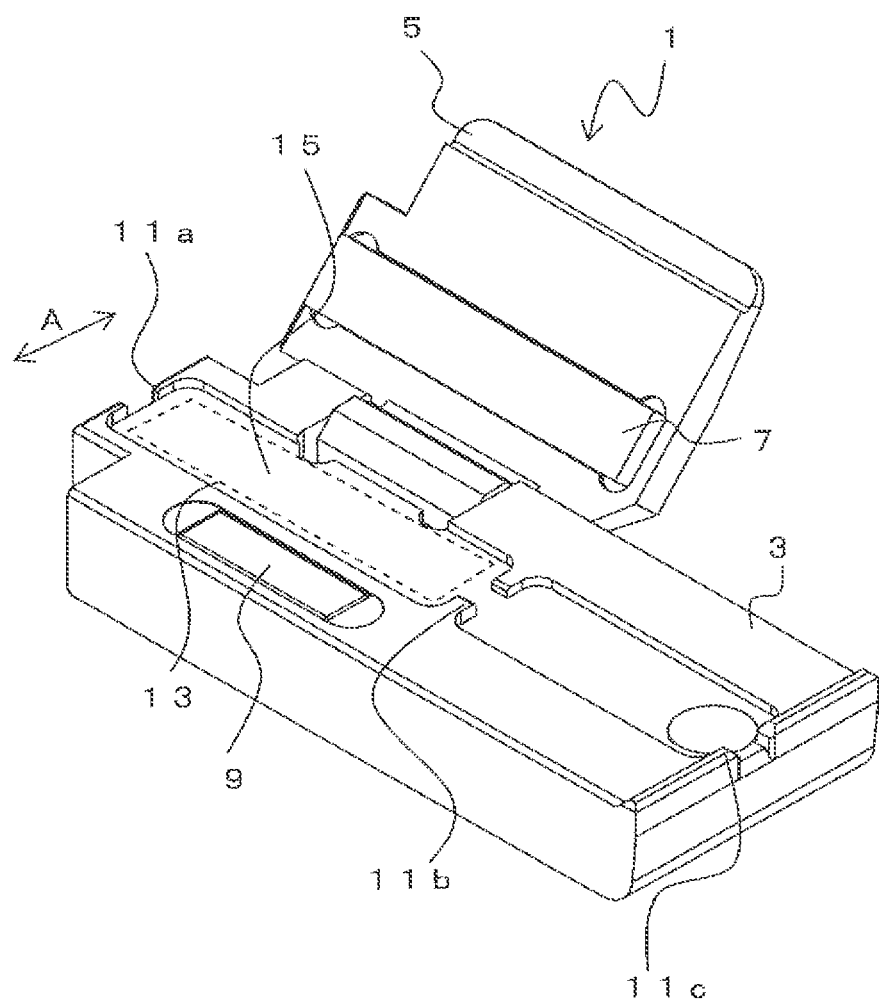
FIG. 1 is a perspective view showing an optical fiber holding member 1.
Figure 2:
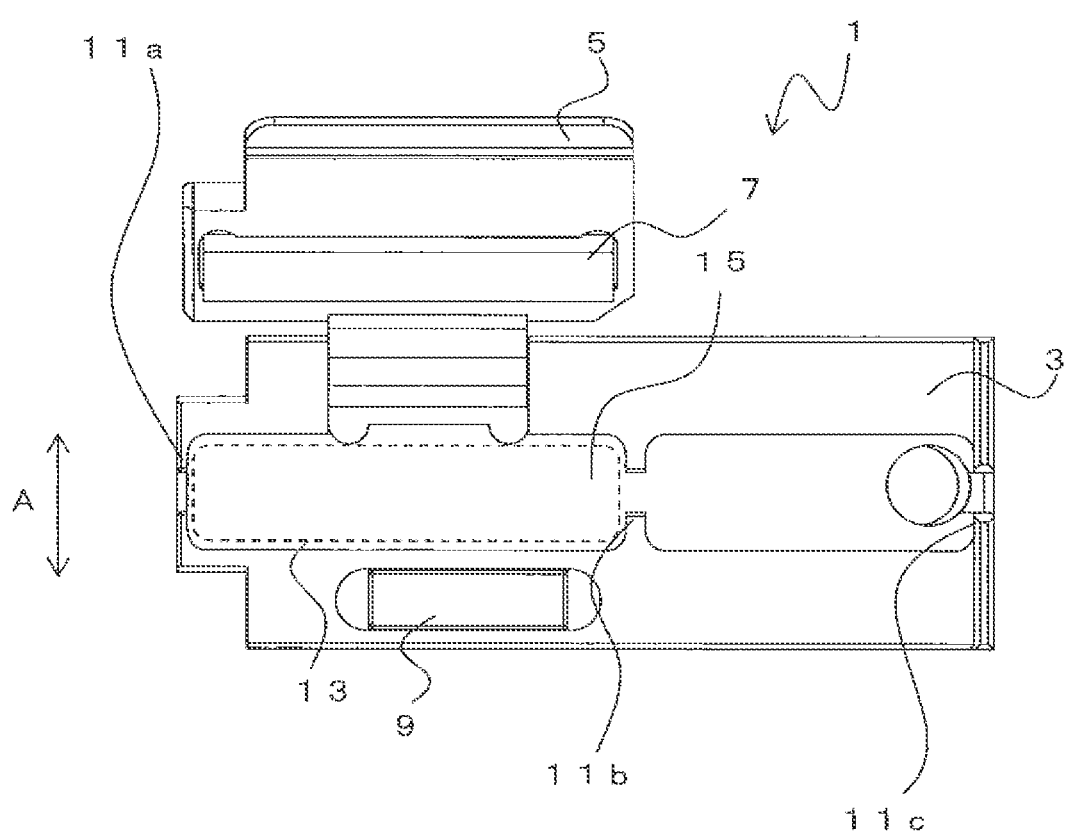
FIG. 2 is a plan view showing the optical fiber holding member 1.

Hereinafter, an optical fiber holding member 1 according to an embodiment will be described. FIG. 1 is a perspective view showing the optical fiber holding member 1 and FIG. 2 is a plan view showing the optical fiber holding member 1. The optical fiber holding member 1 mainly includes a main body section 3, a lid section 5, a pressing member 7, and so on.

The main body section 3 is a section on which an optical fiber is disposed and is a substantially rectangular parallelepiped member. A direction perpendicular to a longitudinal direction of the main body section 3 (an axial direction of an optical fiber ribbon that is to be held) will be referred to as a width direction of the main body section 3 (A in the drawing). The lid section 5, which can be opened or closed to the main body section 3 by means of a hinge, is provided on one of the sides of the width direction of the main body section 3.

The main body section 3 and the lid section 5 are made of metal, for example. A magnet 9 is disposed on a surface of the main body section 3 facing the lid section 5. When the lid section 5 is closed, the magnet 9 can keep the lid section 5 closed to the main body section 3. The lid section 5 is adjusted so that a back face of the lid section 5 is substantially parallel to an upper surface of the main body section 3 when closed.

An inner surface of the lid section 5 (a surface facing the main body section 3) has the pressing member 7 formed over the longitudinal direction. The pressing member 7 protrudes from the inner surface of the lid section 5 for a predetermined amount. The pressing member 7 is a member that presses and holds an optical fiber ribbon that is to be disposed on the main body section 3. The pressing member 7 is made of a material such as resin, which does not damage optical fibers.

An optical fiber placement surface 15, on which an optical fiber ribbon is to be disposed, is formed on the upper surface of the main body section 3 (a surface facing the lid section 5). At least a part of the optical fiber placement surface 15 has no grooves or the like on which an optical fiber ribbon is to be disposed.

Figure 3A:
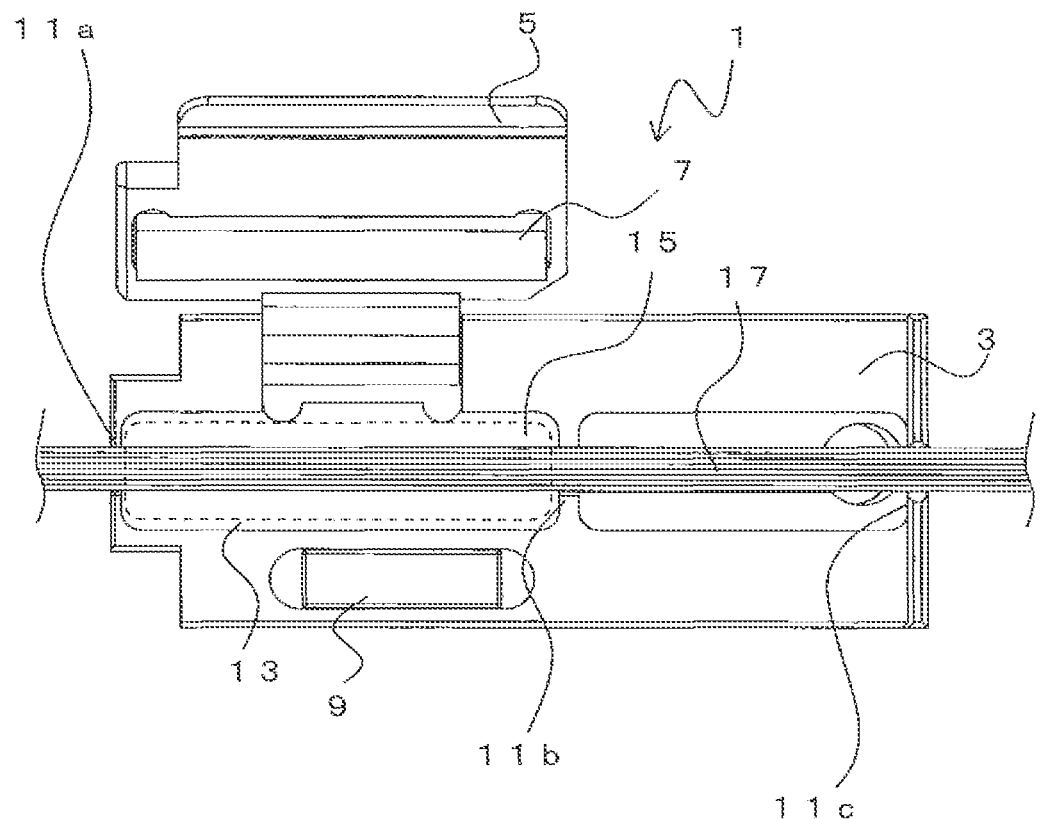
FIG. 3A is a drawing showing the optical fiber holding member 1 disposed with an optical fiber ribbon 17 disposed therein.

FIG. 3A is a plan view showing a state in which an optical fiber ribbon 17 is disposed on the optical fiber placement surface 15. The optical fiber ribbon 17 may include a plurality of optical fibers bonded side by side over its entire length, or may be an intermittently bonded ribbon as mentioned above. Although examples using the optical fiber ribbon 17 will be shown in the descriptions hereinafter, it is not necessarily be the optical fiber ribbon 17 and, for example, a plurality of optical fibers bundled side by side that are not bonded to each other may be used.

On the optical fiber placement surface 15, width-directional position restricting sections 11a, 11b, and 11c, which are parallel to the optical fiber placement surface 15, are formed for partially restricting the position of the optical fiber ribbon 17 in its width direction that is perpendicular to the axial direction of the optical fiber ribbon 17. Although the three width-directional position restricting sections 11a, 11b, and 11c are formed in the example shown in the drawing, the number of the width-directional position restricting sections is not limited thereto. However, at least the width-directional position restricting sections 11a and 11c are preferably formed in the proximity of front and rear ends of the main body section 3, respectively.

Here, a part of the optical fiber placement surface 15 other than the width-directional position restricting sections 11a, 11b, and 11c has wider enough width than the width-directional position restricting sections 11a, 11b, and 11c. Thus, the part other than the width-directional position restricting sections 11a, 11b, and 11c is referred to as a width-directional position non-restricting section 13 (a section presented by dotted lines), which does not restrict the position of the optical fiber ribbon 17 in its width direction.

Figure 3B:
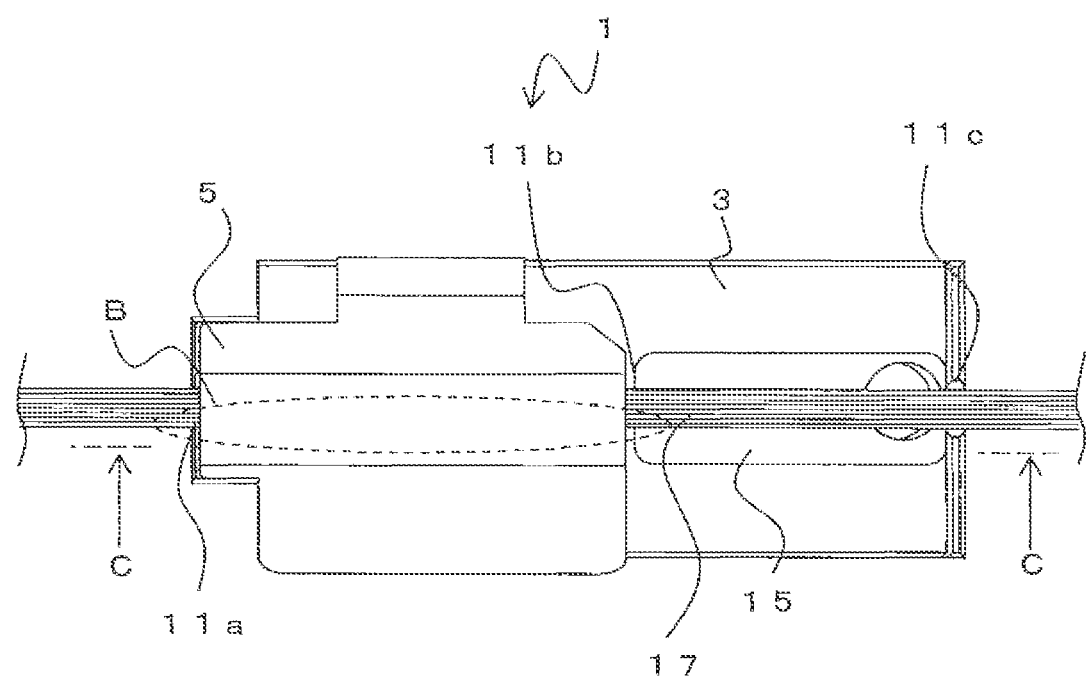
FIG. 3B is a drawing showing the optical fiber holding member 1 in a state in which a lid section 5 is closed.
Figure 4:
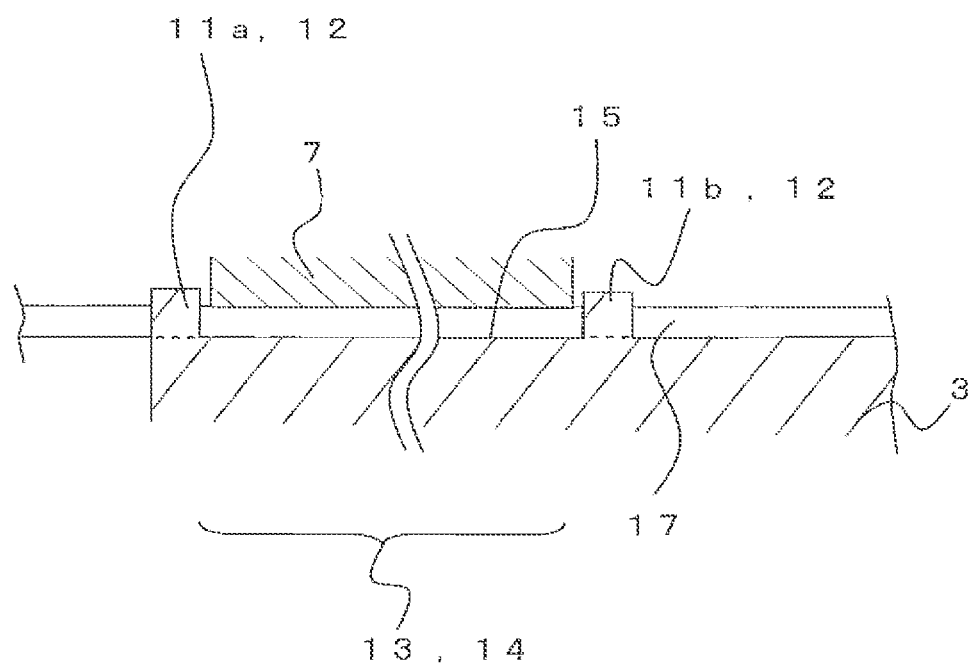
FIG. 4 is a cross sectional view of B section taken along C-C line in FIG. 3B.

FIG. 3B is a plan view showing a state in which the lid section 5 is closed and FIG. 4 is a cross sectional view of B section taken along C-C line in FIG. 3B. The above-mentioned pressing member 7 is formed at a part corresponding to the width-directional position non-restricting section 13. Thus, the pressing member 7 presses the optical fiber ribbon 17 disposed on the width-directional position non-restricting sections 13 when the lid section 5 is closed.

The part of the optical fiber ribbon 17 that is pressed by the pressing member 7 is referred to as a main pressing section 14.

The width-directional position restricting sections 11a and 11b are formed in the front and at the rear of the main pressing section 14 in regard to the axial direction of the optical fiber ribbon 17. That is, the pressing member 7 is not disposed at the positions facing the width-directional position restricting sections 11a, 11b, and 11c. Thus, the optical fiber ribbon 17 is not pressed at the width-directional position restricting sections 11a, 11b, and 11c. That is, the pressing member 7 for pressing the optical fiber ribbon 17 is disposed on the inner surface of the lid 5 only at the position facing the width-directional position non-restricting sections 13 to form the main pressing section 14.

Here, parts where the pressing member 7 does not press the optical fiber ribbon 17 are referred to as non-main pressing sections 12 (hereinafter, a part where the optical fiber ribbon 17 is not pressed at all will be referred to as a "non-pressing section", and a part pressed by smaller pressing force than that by the pressing member 7 including the non-pressing section will be referred to as a "non-main pressing section"). That is, at the non-main pressing sections 12, there is no pressing force applied to the optical fiber ribbon 17 from the pressing member 7 and the optical fiber ribbon 17 is not held.

Here, it is preferable that the width-directional position restricting sections 11a, 11b, and 11c are formed higher than a thickness of the optical fiber ribbon 17 to be disposed. That is, a sidewall height of the width-directional position restricting sections 11a, 11b, and 11c is set larger than outer diameters of optical fibers forming the optical fiber ribbon 17 (the thickness of the optical fiber ribbon). Thus, with the lid section 5 being closed, the heights of the width-directional position restricting sections 11a, 11b, and 11c from the optical fiber placement surface are higher than a height of a gap between the pressing member 7 and the optical fiber placement surface 15.

As above, the main pressing section 14 that presses the optical fiber ribbon 17 is formed at the width-directional position non-restricting section 13. Thus, the main pressing section 14 can exert holding force to prevent shifting of the optical fiber ribbon 17 in its axial direction. At this occasion, no grooves or the like that restrict the position of the optical fiber ribbon 17 in its width direction are formed at the main pressing section 14. Thus, optical fibers do not ride over both sides of the groove.

In particular, when the optical fiber ribbon 17 is an intermittently bonded ribbon, in which a plurality of optical fibers are not bonded over the entire length thereof, or a bundled fiber of a plurality of optical fibers that are not bonded to each other, the thickness of the optical fiber ribbon is smaller compared to that of a conventional optical fiber ribbon which is collectively coated over its entire length. However, if the depth of the groove is set shallower to suit this thickness, since optical fibers are not completely bonded to each other, the optical fibers may be disarranged and ride over both sides of the groove.

The presently described embodiments can be used ideally in particular to fix such an optical fiber ribbon that is not collectively coated over its entire length.

Also, the position of the optical fiber ribbon 17 is restricted in its width direction by the width-directional position restricting sections 11a, 11b, and 11c. Thus, positioning of the optical fiber ribbon 17 in its width direction can be performed with certainty. In particular, since the width-directional position restricting sections 11a and 11c are formed at both ends of the longitudinal direction of the main body section 3, positioning of the optical fiber ribbon 17 in its width direction can be performed with more certainty.

Also, the non-main pressing sections 12 of the optical fiber ribbon 17 are formed at the width-directional position restricting sections 11a, 11b, and 11c. Thus, even if an optical fiber rides over the width-directional position restricting sections 11a, 11b, or 11c, the optical fiber riding over would not be pressed so strongly.

Also, the optical fiber ribbon 17 is not pressed at the width-directional position restricting sections 11a, 11b, and 11c, so the height of the width-directional position restricting sections 11a, 11b, and 11c can be higher enough than the thickness of the optical fiber ribbon 17. Thus, it is possible to prevent the optical fibers from riding over the width-directional position restricting sections 11a, 11b, and 11c.

Figure 5:
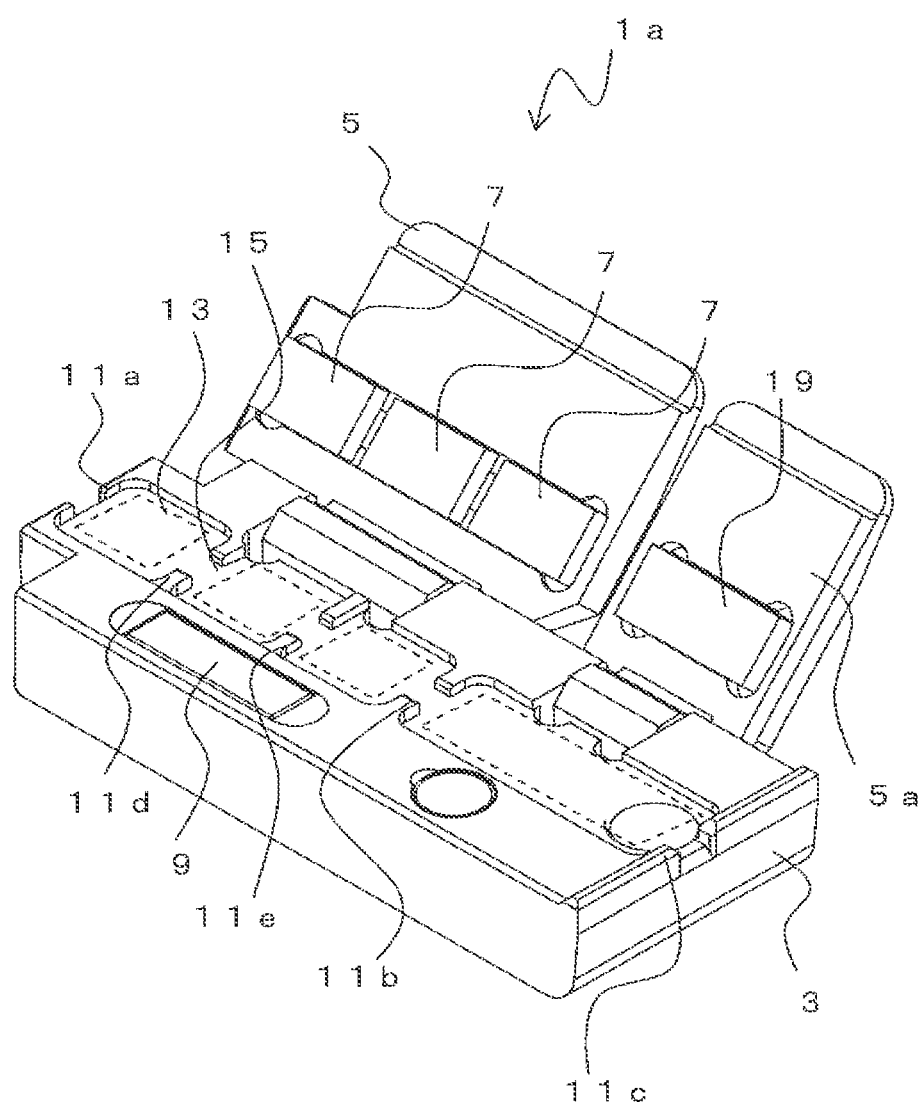

Next, a second embodiment will be described. FIG. 5 is a perspective view showing an optical fiber holding member 1a according to the second embodiment. In the descriptions hereinafter, the same notations as in FIG. 1 to FIG. 4B will be used for the structures having the same functions as in the optical fiber holding member 1 and redundant descriptions will be omitted.

The optical fiber holding member 1a has approximately the same structure as the optical fiber holding member 1 except that the pressing member 7 is divided into a plurality of segments in the longitudinal direction and a lid section 5a is further provided. In the optical fiber holding member 1a, the width-directional position non-restricting section 13 is divided into a plurality of segments in the longitudinal direction of the main body section 3. That is, width-directional position restricting sections 11d and 11e are further formed between the width-directional position restricting sections 11a and 11b, being spaced from each other.

On the inner surface of the lid section 5 facing the width-directional position non-restricting sections 13, the each divided pressing member 7 is disposed corresponding to every width-directional position non-restricting section 13. That is, the pressing member 7 is divided into a plurality of segments in the axial direction of the optical fiber and disposed. Thus, the pressing member 7 is not provided at the positions of the width-directional position restricting sections 11d and 11e, which become the non-main pressing sections 12. In this way, the optical fiber ribbon 17 can be pressed at a plurality of places that are spaced from each other.

Here, the optical fiber ribbon 17 is pressed strongly at the main pressing sections 14 against the optical fiber placement surface 15. Whereas at the non-main pressing sections 12, the optical fiber ribbon 17 is not pressed and the optical fiber ribbon 17 can slightly bend upward lifting itself up.

Thus, if such a bent part of the optical fiber ribbon 17 is formed at the non-main pressing section 12 between the main pressing sections 14, it means that the bent parts of the optical fiber ribbon 17 are formed in the front and at the rear of the main pressing sections 14 in regard to the axial direction of the optical fiber ribbon 17. Thus, if the optical fiber ribbon 17 receives tensile force in its axial direction, friction force between the optical fiber ribbon 17 and the pressing member 7 increases at boundary parts between these bent parts and the main pressing sections 14 so as to stop the shifting of the optical fiber ribbon 17 in the axial direction. That is, the holding force for the optical fiber ribbon 17 can be improved.

It should be noted that it is unnecessary to divide the pressing member 7 if the main pressing section 14 is divided into a plurality of segments in the axial direction of the optical fiber ribbon 17. For example, the three pressing member 7 to be disposed on the lid section 5 may be formed as one body and the pressing member 7 may have grooves (parts with less thickness) formed in the width direction thereof at the parts corresponding to the width-directional position restricting sections 11d and 11e. In this way, an amount of protrusion of the pressing member 7 from the back face of the lid section 5 is small at these grooves so the non-main pressing sections 12 can also be formed.

Also, the optical fiber holding member 1a further includes the other lid section 5a provided at the rear of the lid section 5. The lid section 5a has substantially the same structure as the lid section 5. That is, the lid section 5a is also made of metal and can be kept closed by means of a magnet.

On an inner surface of the lid section 5a, a temporarily pressing member 19 is provided. The temporarily pressing member 19 is a part that presses the optical fiber ribbon 17. However, the pressing force exerted by the temporarily pressing member 19 to the optical fiber ribbon 17 may be less than the pressing force exerted by the pressing member 7. That is, the optical fiber holding member 1a has a plurality of the lid sections 5 and 5a disposed and one of the lid sections—the lid section 5a—has the temporarily pressing member 19 with less pressing force than that of the pressing member 7.

Here, to reduce the pressing force of the temporarily pressing member 19 less than the pressing force of the pressing member 7, the temporarily pressing member 19 may be made of a softer material than the material for the pressing member 7, for example. Alternatively, the amount of protrusion of the temporarily pressing member 19 from the inner surface of the lid section 5a may be smaller than the amount of protrusion of the pressing member 7 from the inner surface of the lid section 5. That is, a gap between the temporarily pressing member 19 and the optical fiber placement surface 15 with the lid section 5a being closed may be larger than a gap between the pressing member 7 and the optical fiber placement surface 15 with the lid section 5 being closed.

In the present embodiments, a part of the optical fiber ribbon 17 pressed by the temporarily pressing member 19 is the non-main pressing section 12. That is, only the part of the optical fiber ribbon 17 that is strongly pressed by the pressing member 7 is defined as the main pressing section 14, and temporarily pressing section pressed by relatively weaker pressing force than this is defined as the non-main pressing section 12. Thus, the non-main pressing section 12 includes a non-pressing section where the optical fiber ribbon 17 is pressed with zero pressing force and the parts where the pressing force is relatively smaller than the main pressing section 14, which carries out the main pressing.

In the present embodiment, the width-directional position non-restricting section 13 is formed on a surface facing the temporarily pressing member 19. Thus, in the width-directional position non-restricting section 13, the optical fiber ribbon 17 can be temporarily pressed. By temporarily pressing the optical fiber ribbon 17, it is possible to prevent the optical fiber ribbon 17 from moving in its width direction.

For example, although enough holding force may be secured for the optical fiber ribbon 17 by the main pressing section 14, if a pressing range is short, the position of the optical fiber ribbon 17 in front of the main pressing section 14 may shift by touching the optical fiber ribbon 17 at the rear of the main pressing section 14. Weakly pressing the optical fiber ribbon 17 by the temporarily pressing member 19 can prevent such influence.

However, since the temporarily pressing member 19 is provided facing the width-directional position non-restricting section 13, the pressing member 7 may be provided in place of the temporarily pressing member 19 so as to be one of the divided sections of the main pressing section 14.

According to the second embodiment, the same effects as in the first embodiment can be obtained. Also, dividing the main pressing section 14 into a plurality of segments in the axial direction of the optical fiber ribbon 17 can increase the holding force of the optical fiber ribbon 17.

Also, the lid section 5a is further provided in addition to the lid section 5 and the temporarily pressing member 19, or the pressing member 7, is provided on the lid section 5a so as to press the optical fiber ribbon 17. Thus, position shifting of the optical fiber ribbon 17 can be prevented.

Although the main pressing section 14 is divided and the temporarily pressing member 19 is further formed on the lid section 5a in the present embodiment, either one alone may be adopted. For example, for the optical fiber holding member 1, only the main pressing section 14 may be divided into a plurality of sections, or, for the optical fiber holding member 1, only the lid section 5a may be disposed.

Figure 6:
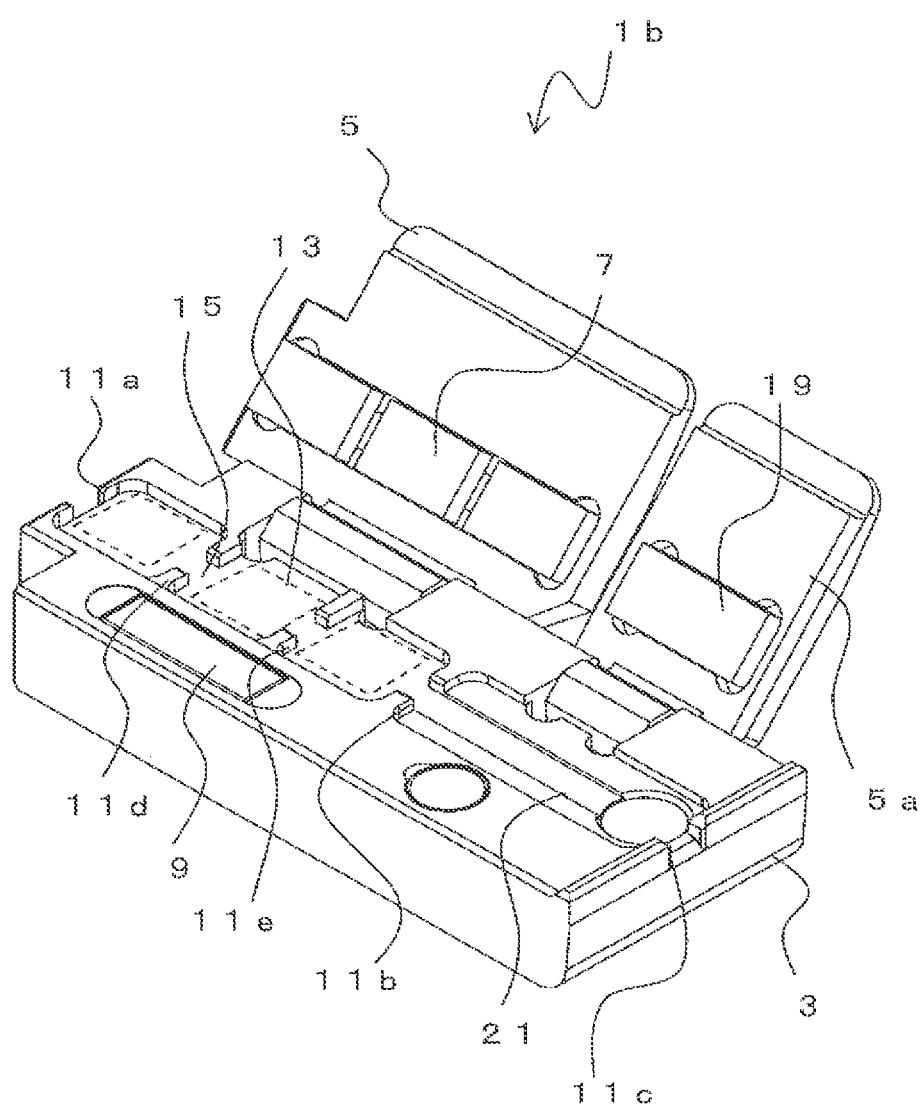
FIG. 6 is a perspective view showing an optical fiber holding member 1b.

Next, a third embodiment will be described. FIG. 6 is a perspective view showing an optical fiber holding member 1b according to the third embodiment. The optical fiber holding member 1b has approximately the same structure as the optical fiber holding member 1a except that a groove 21 is formed therein.

The groove 21 is formed along the longitudinal direction of the main body section 3 on a surface facing the lid section 5a. The groove 21 functions as a width-directional position restricting section that restricts the position of the optical fiber ribbon 17 in its width direction. That is, in the optical fiber holding member 1b, a groove-shaped width-directional position restricting section (the groove 21) is formed in addition to the above-mentioned width-directional position restricting sections 11a, 11b, 11c, 11d, and 11e.

At least a part having no groove 21 (the width-directional position restricting section) formed is formed on the optical fiber placement surface 15. In the example shown in the drawing, the groove 21 is not formed between the width-directional position restricting sections 11a and 11b. Thus, spaces between the width-directional position restricting sections 11a, 11b, 11d and 11e respectively is referred to as the width-directional position non-restricting section 13.

The pressing member 7 is formed at a part corresponding to the width-directional position non-restricting section 13 on the inner surface of the lid section 5. That is, also in the optical fiber holding member 1b, the main pressing section 14 is formed only at the width-directional position non-restricting section 13.

Here, a groove depth of the groove 21 is less than the thickness of the optical fiber ribbon 17, for example. Thus, a part of the optical fiber ribbon 17 disposed in the groove 21 protrudes above the groove 21. Also, the temporarily pressing member 19 is formed on the inner surface of the lid section 5a facing the groove 21. Thus, when the lid section 5a is closed, the temporarily pressing member 19 temporarily presses the optical fiber ribbon 17 inside the groove 21 from above.

At this occasion, as mentioned above, the temporarily pressing section by the temporarily pressing member 19 is the non-main pressing section 12. That is, the pressing force by the temporarily pressing member 19 is weak and thus the temporarily pressing member 19 does not press the optical fiber ribbon 17 strongly.

Increasing the depth of the groove 21 more than a predetermined amount can prevent optical fibers from riding over as well as decrease the pressing force against the optical fiber ribbon 17. For example, if the ratio of the depth of the groove 21 to the thickness of the optical fiber ribbon 17 is 0.7 or more (less than 1.0), it is possible to prevent optical fibers from riding over. However, in this case, it is difficult to apply sufficient pressing force to the optical fiber ribbon 17 on its own and thus it is necessary to provide an extra main pressing section 14 at the width-directional position non-restricting section 13. Also, if the depth of the groove is deep enough like this (the ratio of the depth to the thickness of the optical fiber ribbon 17 is 0.7 or more), the pressing member 7 may be disposed on the inner surface of the lid section 5a in place of the temporarily pressing member 19.

That is, increasing the depth of the groove 21 can decrease the pressing force of the pressing member 7 or the temporarily pressing member 19 on the inner surface of the lid section 5a. Even in this case, in which the groove 21 is formed on a part of the main body section 3, if the pressing force against the optical fiber ribbon 17 in a forming range of the groove 21 can be weaker than the pressing force at the main pressing section 14 in the width-directional position non-restricting section 13, then the forming range of the groove 21 can be considered as the non-main pressing section 12. Also, if the ratio of the depth of the groove 21 to the thickness of the optical fiber ribbon 17 is 1.0 or more, the pressing force against the optical fiber ribbon 17 disappears and the groove 21 becomes a non-pressing section.

According to the third embodiment, the same effects as in the first embodiment can be obtained. As above, if the width-directional position non-restricting section 13 is formed on at least a part of the longitudinal direction of the main body section 3, only the width-directional position non-restricting section 13 becomes the main pressing section 14, and the width-directional position restricting sections become the non-main pressing sections 12, then the groove 21 may be formed at a part thereof.

Figure 7:
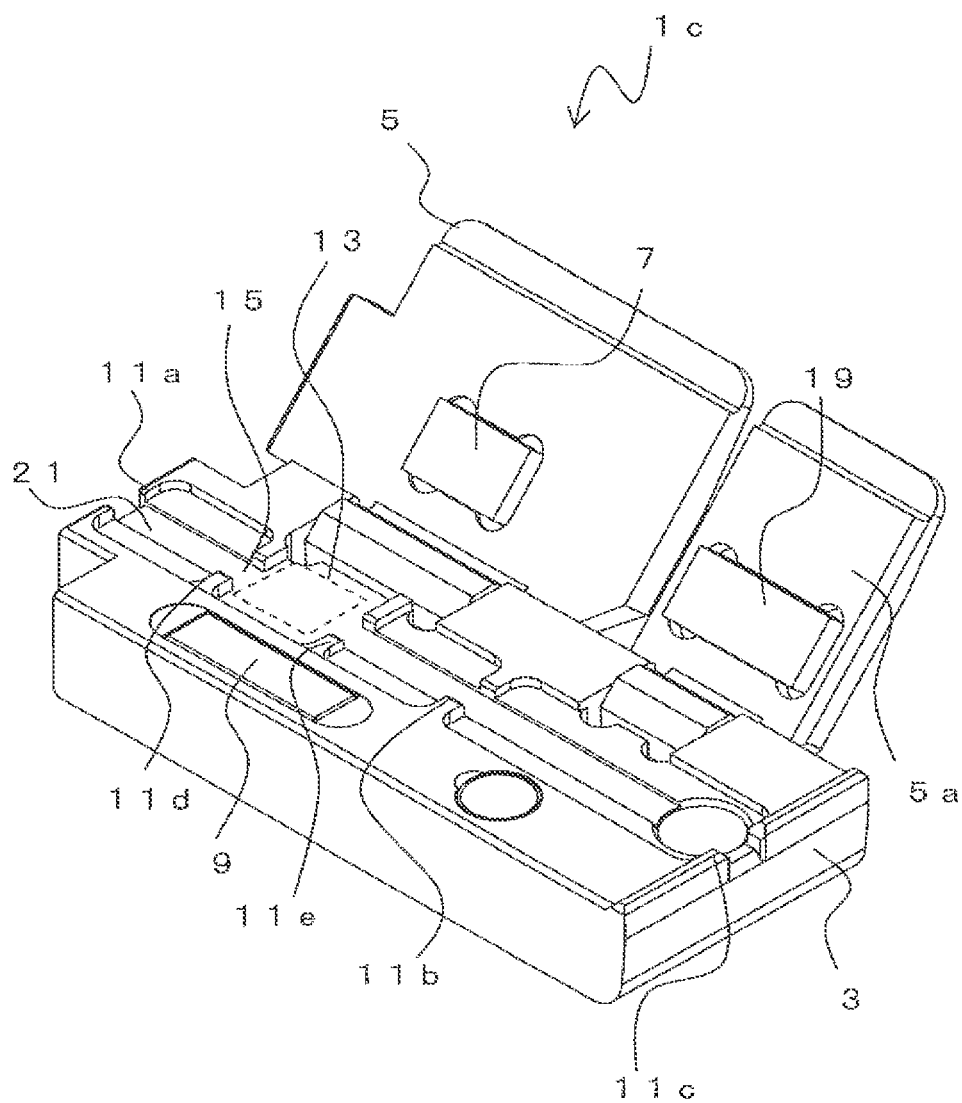
FIG. 7 is a perspective view showing an optical fiber holding member 1c.

Next, a fourth embodiment will be described. FIG. 7 is a perspective view showing an optical fiber holding member 1c according to the fourth embodiment. The optical fiber holding member 1c has approximately the same structure as the optical fiber holding member 1b except that the forming range of the groove 21 is different.

The optical fiber placement surface 15 has at least a part on which the groove 21 (the width-directional position restricting section) is not formed. In the example shown in the drawing, the groove 21 is not formed between the width-directional position restricting sections 11d and 11e. Thus, a space between the width-directional position restricting sections 11d and 11e is the width-directional position non-restricting section 13.

The pressing member 7 is formed at a part corresponding to the width-directional position non-restricting section 13 on the inner surface of the lid section 5. That is, also in the optical fiber holding member 10, the main pressing section 14 is formed only at the width-directional position non-restricting section 13. Also, the range on which the groove 21 is formed, and which is also a surface facing the lid section 5, is the non-main pressing section 12.

As mentioned above, because of the temporarily pressing member 19 disposed, the surface facing the lid section 5a becomes the non-main pressing section 12. That is, since the pressing force of the temporarily pressing member 19 is weak, the temporarily pressing member 19 does not strongly press the optical fiber ribbon 17. Also, if the pressing member 7 is disposed in place of the temporarily pressing member 19, increasing the depth of the groove 21 more than the predetermined amount can reduce the pressing force of the pressing member 7 as well as prevent optical fibers from riding over. Thus, optical fibers would not be damaged.

According to the fourth embodiment, the same effects as in the first embodiment can be obtained. As above, if the width-directional position non-restricting section 13 is formed on at least a part of the longitudinal direction of the main body section 3 and only the width-directional position non-restricting section 13 becomes the main pressing section 14, then the groove 21 may be formed at the other parts thereof.

Although an example in which the width-directional position non-restricting section 13 is formed between the width-directional position restricting sections 11d and 11e in the example shown in the drawing, any position or a plurality of positions of the width-directional position non-restricting section 13 may be allowed. Preferably, the width-directional position non-restricting section 13 is formed on a front end side (between the width-directional position restricting sections 11a and 11d). Also, the depth of the groove can be set similarly as in the third embodiment and the groove 21 can be either the non-main pressing section or non-pressing section.

Figure 8:
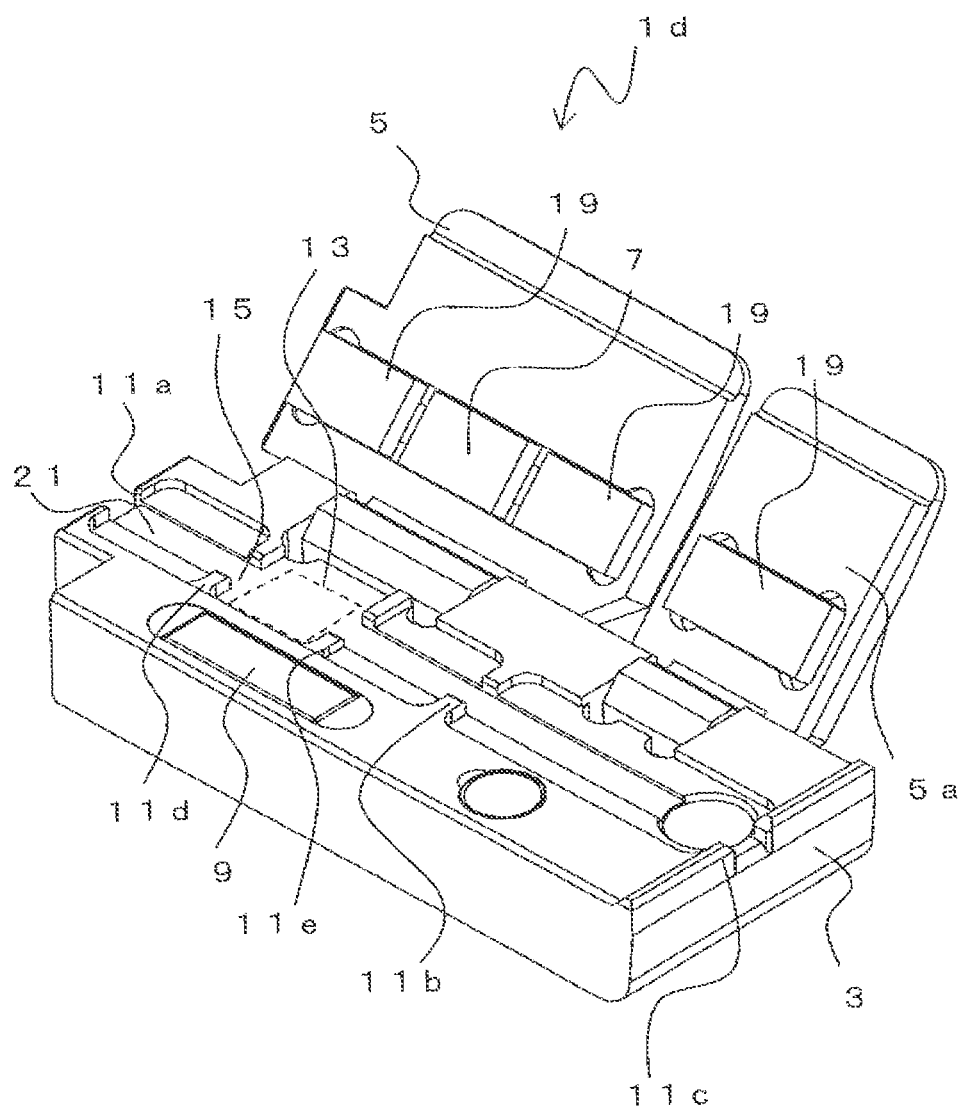
FIG. 8 is a perspective view showing an optical fiber holding member 1d.

Next, a fifth embodiment will be described. FIG. 8 is a perspective view showing an optical fiber holding member 1d according to the fifth embodiment. The optical fiber holding member 1d has approximately the same structure as the optical fiber holding member 1c except that the temporarily pressing member 19 is formed also on the lid section 5.

The optical fiber holding member 1d has the groove 21 formed as similarly as in the optical fiber holding member 1c. The pressing member 7 is disposed at a part of the lid section 5 that corresponds to the width-directional position non-restricting section 13. Also, the temporarily pressing members 19 are disposed at the parts of the lid section 5 that correspond to the groove 21 (excluding parts that correspond to the width-directional position restricting sections 11a, 11b, 11d, and 11e).

As mentioned above, the temporarily pressing member 19 does not strongly press the optical fiber ribbon 17. That is, the pressing force of the temporarily pressing member 19 is weaker than that of the pressing member 7, which forms the non-main pressing section 12.

Even in this case, if the depth of the groove 21 is equal to or larger than the predetermined amount, the pressing member 7 may be disposed in place of the temporarily pressing member 19. Also, if the pressing member 7 is disposed in place of the temporarily pressing member 19, increasing the depth of the groove 21 equal to or more than the predetermined amount can prevent optical fibers from riding over as well as decrease the pressing force against the optical fiber ribbon 17 so as to form the non-main pressing section 12. Thus, the optical fiber may not be damaged. Also, the depth of the groove can be set as similarly as in the third embodiment and the groove 21 can be either the non-main pressing section or the non-pressing section.

According to the fifth embodiment, the same effects as in the first embodiment can be obtained. The temporarily pressing member 19 may be disposed on both of the lid sections 5 and 5a as above. That is, when a plurality of the lid sections 5 and 5a are disposed, at least one of the lid sections may have the temporarily pressing member 19, which exerts smaller pressing force than the pressing member 7, disposed.

Also, if the groove 21 is formed, increasing the depth of the groove 21 can prevent optical fibers from riding over as well as decrease the pressing force of the pressing member 7 and the like. Thus, the parts corresponding to the groove 21 can be the non-main pressing sections 12.

Figure 9:
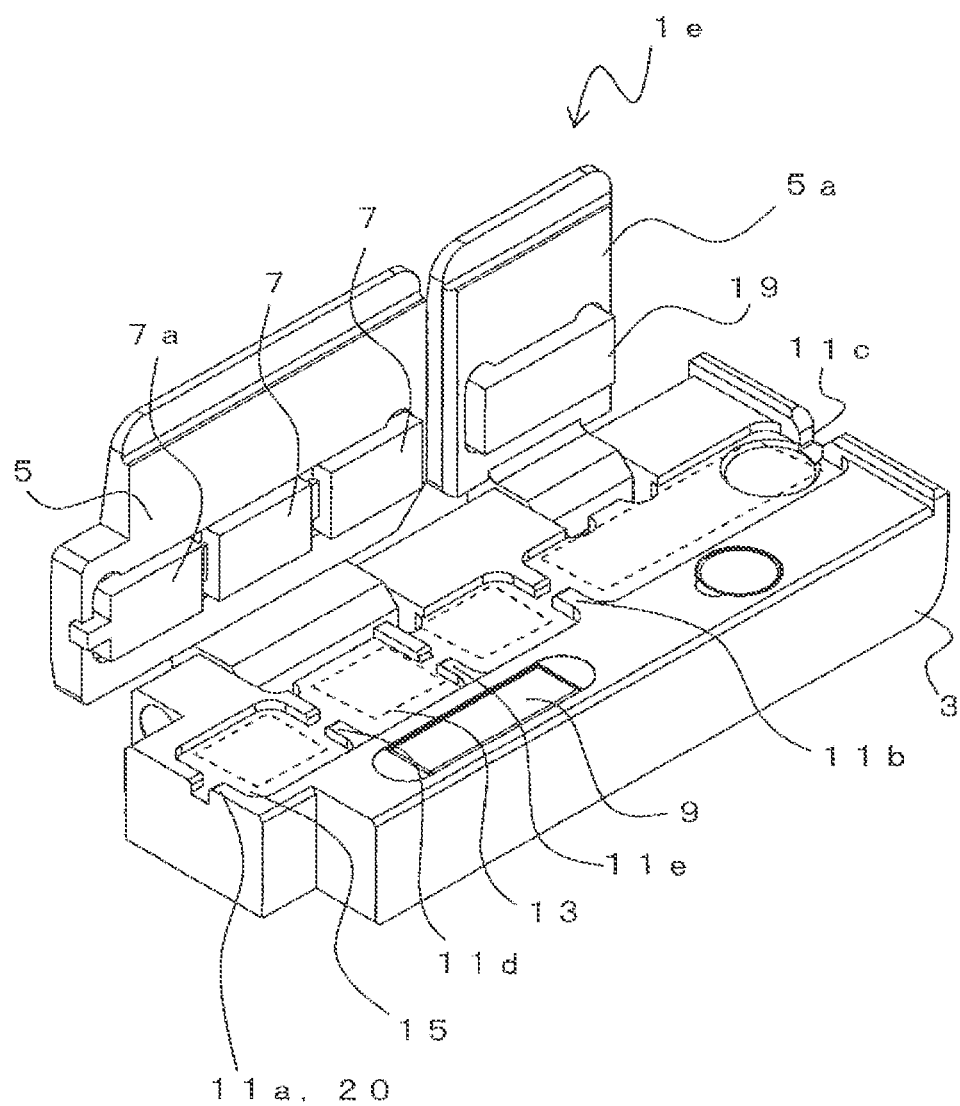
FIG. 9 is a perspective view showing an optical fiber holding member 1e.

Next, a sixth embodiment will be described. FIG. 9 is a perspective view showing an optical fiber holding member 1e according to the sixth embodiment. The optical fiber holding member 1e has approximately the same structure as in the optical fiber holding member 1a except that a pressing member 7a is disposed at a part facing the width-directional position restricting section 11a, which is in the proximity of the front end of the main body section, (hereinafter, a front-end width-directional position restricting section 20).

The pressing member 7a in the proximity of front end of the lid section 5 has approximately the same structure as the pressing member 7. However, the pressing member 7a is formed as a unified body of a pressing surface for the front-end width-directional position restricting section 20 and a pressing surface for the width-directional position non-restricting section 13 at the rear of the front-end width-directional position restricting section 20. That is, the pressing member 7a can simultaneously press the width-directional position non-restricting section 13 part and the front-end width-directional position restricting section 20.

A width of a front end of the pressing member 7a corresponds to a width of the front-end width-directional position restricting section 20. That is, the pressing member 7a is formed so that the width of a part that presses the front-end width-directional position restricting section 20 is smaller than that of a part that presses the width-directional position non-restricting section 13. Thus, when the lid section 5 is closed, the front end part of the pressing member 7a fits into the front-end width-directional position restricting section 20 and can press the optical fiber.

The pressing member 7 is not disposed at any of the parts corresponding to the width-directional position restriction sections 11b to 11e except for the front-end width-directional position restricting section 20, and, similarly as the above-mentioned embodiments, the pressing members 7, which press the optical fiber, are disposed on the inner surface of the lid section 5 at the parts facing the width-directional position non-restricting sections 13 to form the main pressing sections.

According to the sixth embodiment, the same effects as in the first embodiment can be obtained. Pressing the optical fibers at the front-end width-directional position restricting section 20 as above can prevent the optical fiber ribbon protruding from the front end of the optical fiber holding member from lifting up. That is, the pressing member may not be disposed at the parts corresponding to only the width-directional position non-restricting sections 13, but only the front end part of the pressing member may be disposed at the part corresponding to the width-directional position restricting section 11a, provided that the width-directional position restricting section 11a is at the front end, so as to form the main pressing section 14.

Figure 10:
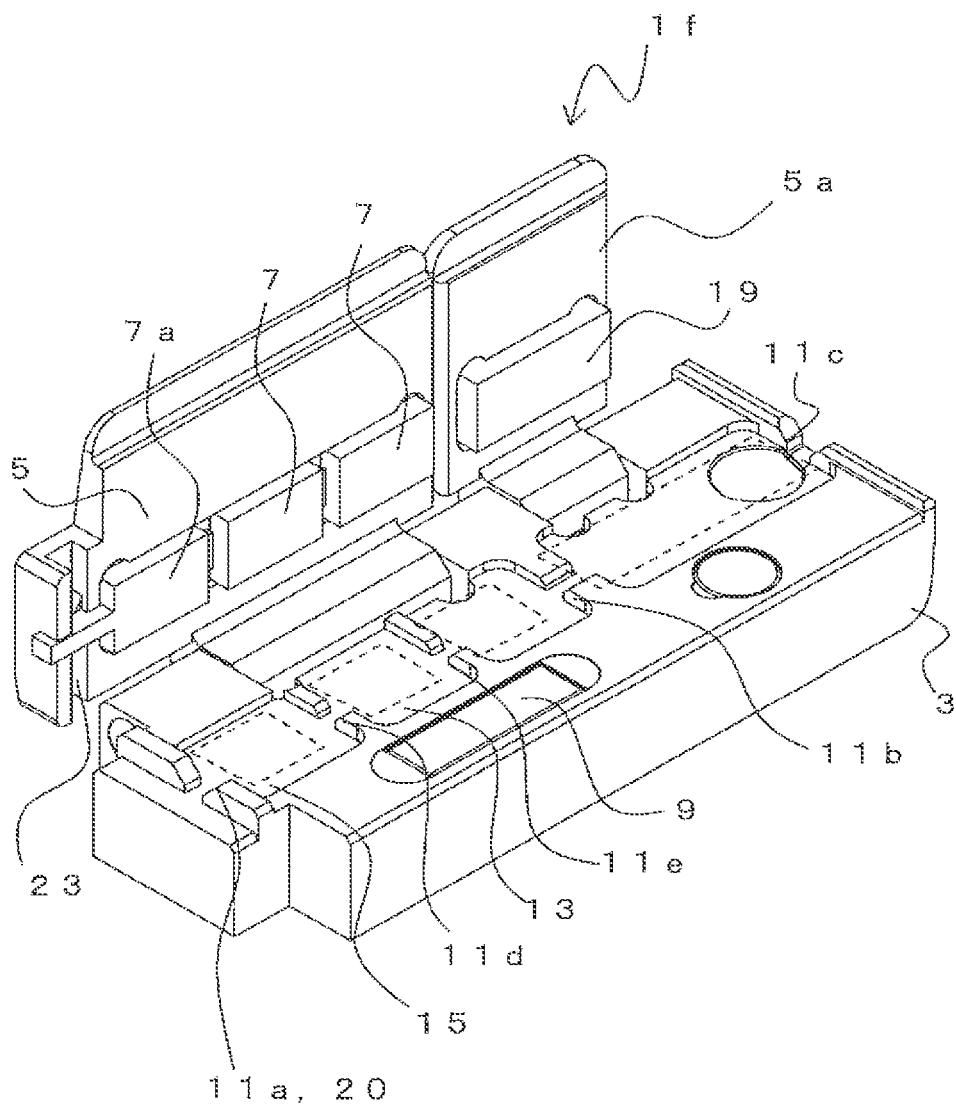
FIG. 10 is a perspective view showing an optical fiber holding member 1f.

Next, a seventh embodiment will be described. FIG. 10 is a perspective view showing an optical fiber holding member 1f according to the seventh embodiment. The optical fiber holding member 1f has approximately the same structure as the optical fiber holding member 1e except that the height of the front-end width-directional position restricting section 20 is different.

The height of the front-end width-directional position restricting section 20 is higher than the heights of the other width-directional position restricting sections 11b to 11e. In this way, it is possible to prevent the optical fiber disposed at the front-end width-directional position restricting section 20 from riding over the front-end width-directional position restricting section 20. Thus, the optical fiber can be pressed with certainty at the front-end width-directional position restricting section 20.

Also, a cutout section 23 is formed in the lid section 5 at a position facing the front-end width-directional position restricting section 20 to avoid interference with the front-end width-directional position restricting section 20. That is, the tip of the pressing member 7a extends toward the front end striding over the cutout section 23.

In the example shown in the drawing, the main body section 3 protrudes in front of the front-end width-directional position restricting section 20. That is, a width-directional position non-restricting section is formed on a tip side of the front-end width-directional position restricting section 20. In this way, the pressing member 7a can press both the front-end width-directional position restricting section 20 and the width-directional position non-restricting section in front of the front-end width-directional position restricting section 20 at the same time.

According to the seventh embodiment, the same effects as in the sixth embodiment can be obtained. Increasing the height of the front-end width-directional position restricting section 20 as above can prevent the optical fibers from riding over the front-end width-directional position restricting section 20, which is a pressing section. Also, providing the cutout section 23 in the lid section 5 can prevent the front-end width-directional position restricting section 20 from interfering with the lid section 5.

Figure 11:
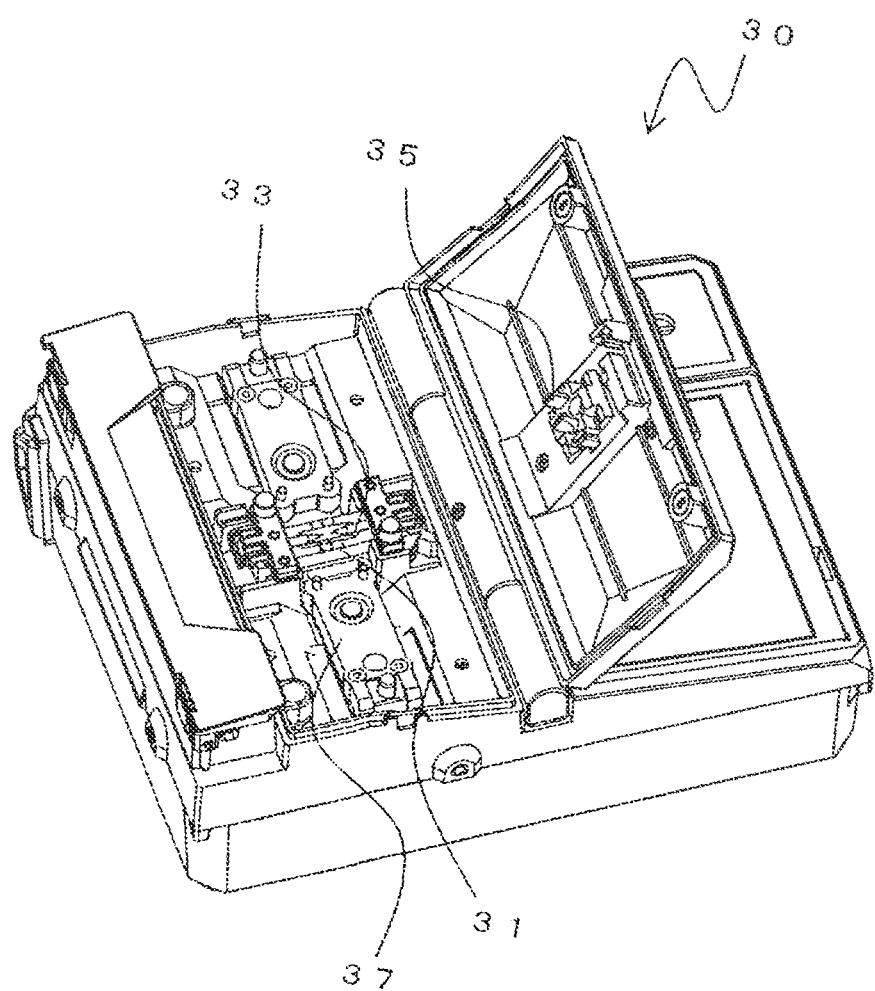
FIG. 11 is a perspective view showing a fusion machine 30.
Figure 12:
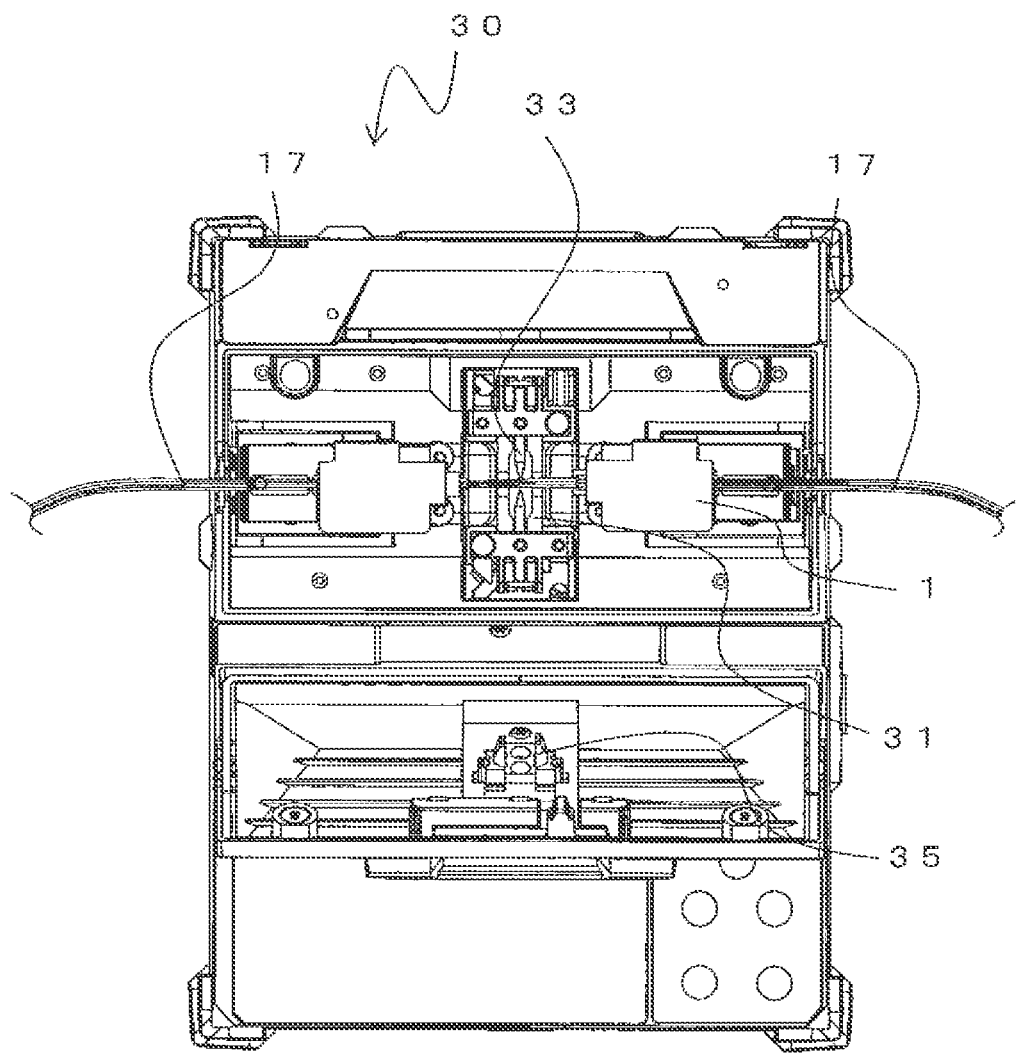
FIG. 12 is a plan view showing the fusion machine 30.
Figure 13A:
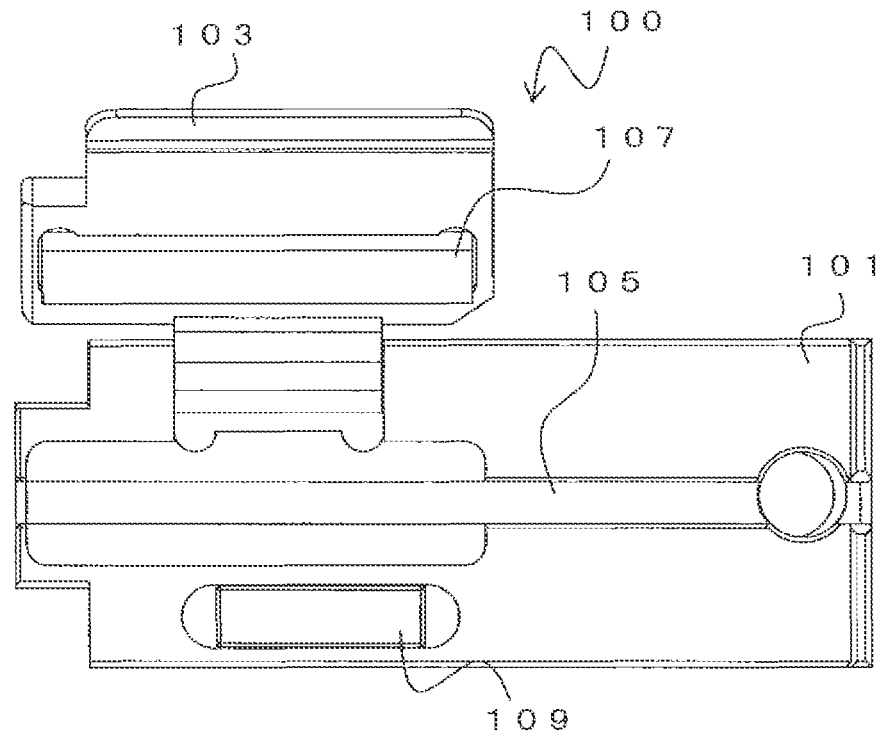
FIG. 13A is a plan view showing a conventional optical fiber holding member 100.
Figure 13B:
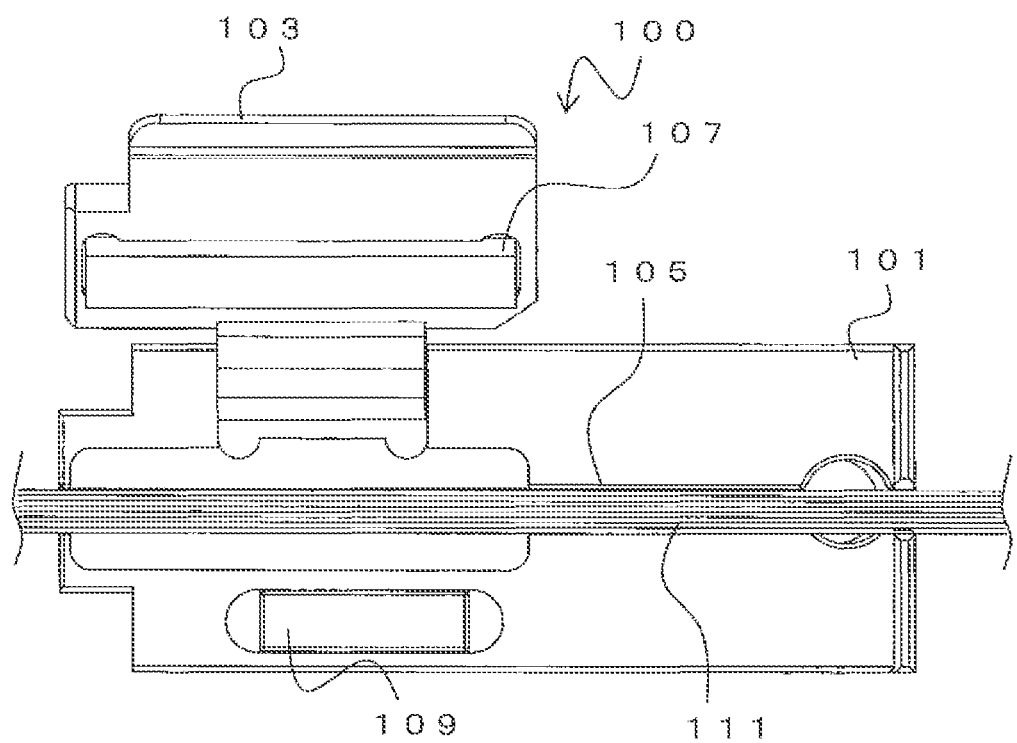
FIG. 13B is a drawing showing a state in which a conventional optical fiber ribbon 111 is disposed.
Figure 14A:
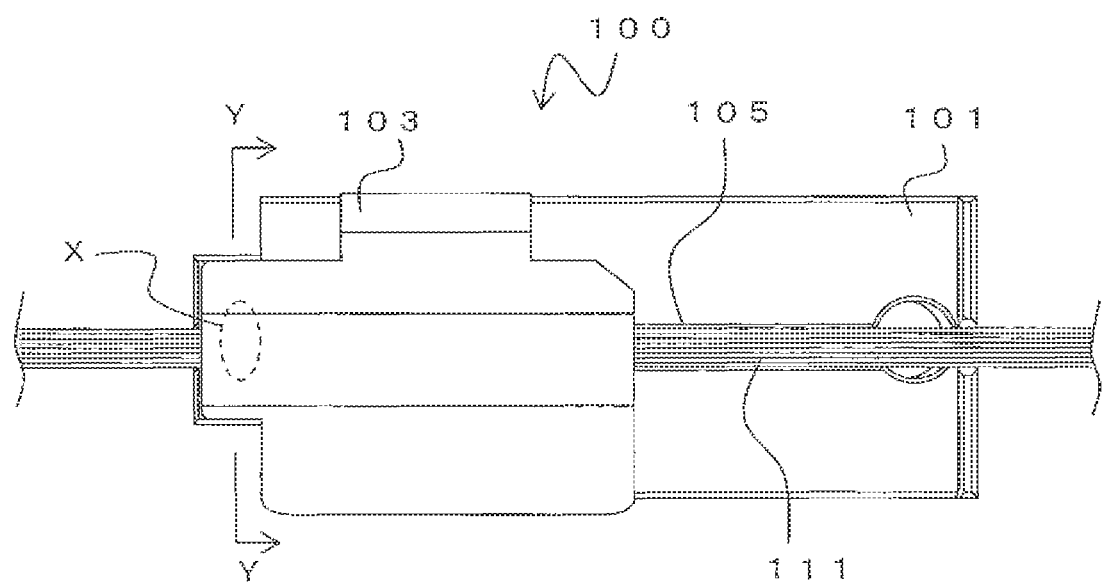
FIG. 14A is a drawing showing the conventional optical fiber holding member 100 in a state in which a lid section 103 is closed.
Figure 14B:
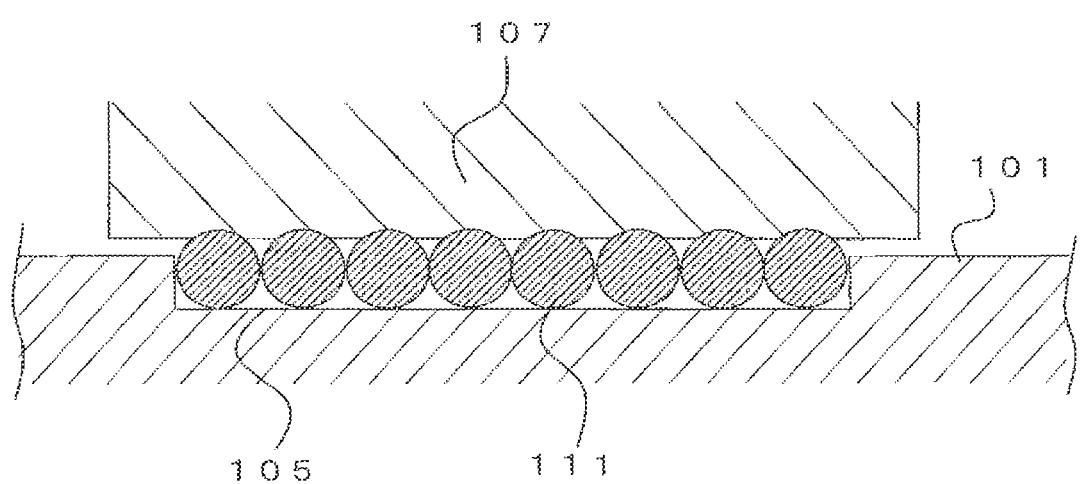
FIG. 14B is a drawing showing the conventional optical fiber holding member 100 and is a cross sectional view of X section taken along Y-Y line in FIG. 14A.
Figure 15:
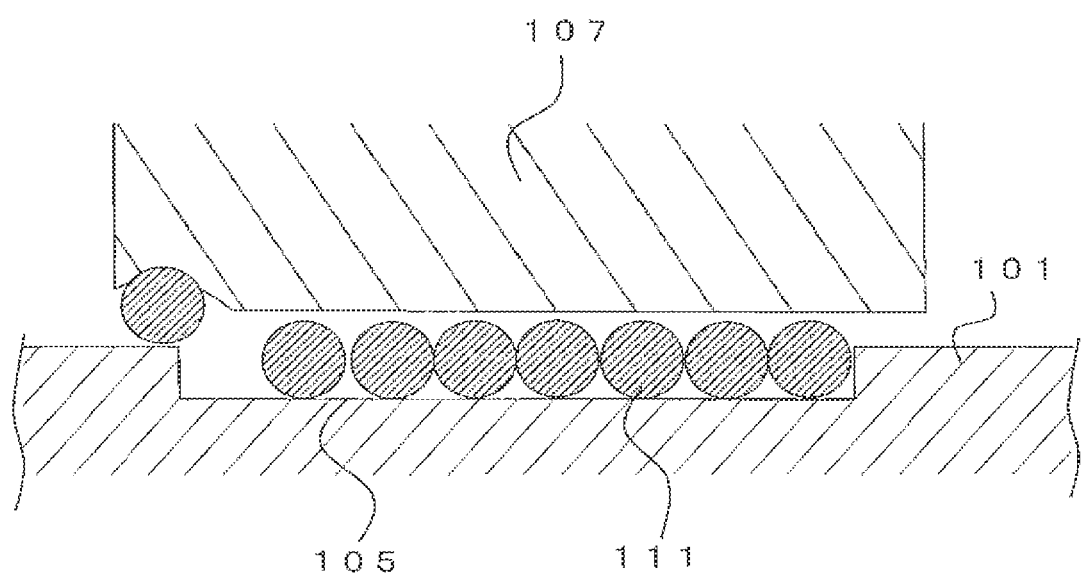
FIG. 15 is a drawing showing a state in which an optical fiber rides over both sides of a groove 105 in the conventional optical fiber holding member 100.

Next, a fusion machine using the optical fiber holding member will be described. FIG. 11 is a perspective view showing a fusion machine 30 and FIG. 12 is a plan view showing a state in which the optical fiber holding member 1 is disposed in the fusion machine 30. In the descriptions hereinafter, an example in which the optical fiber holding member 1 is used will be described. However, either of the above-mentioned optical fiber holding members 1a, 1b, 1c, 1d, 1e, and 1f can also be adopted.

The fusion machine 30 includes a holder mounting section 37 on which the optical fiber holding member 1 is to be mounted, a base member 31 on which tips of optical fibers and electrodes are disposed, electrode rods 33, and the like. The fusion machine 30 joins the optical fiber ribbons 17 held by a pair of the optical fiber holding members 1 to each other by fusion. The pair of the optical fiber holding members 1 are mounted on the holder mounting sections 37 on both sides of the base member 31.

The base member 31 holds a pair of the electrode rods 33 and a pair of front ends of the optical fiber ribbons 17. A clamp 35 provided on the back face of the lid section presses the optical fiber ribbons 17 on the base member 31 from above.

The pair of the optical fiber holding members 1 are disposed facing each other and the front ends of the optical fiber ribbons 17 are butted to each other. In this state, an arc is generated between the pair of the electrode rods 33 to melt and join the front ends of the optical fibers.

As above, with the fusion machine 30 using the optical fiber holding member 1, optical fibers can be spliced together by fusion with certainty.

Although the embodiments have been described referring to the attached drawings, the technical scope of the claims is not limited to the embodiments described above. It is obvious that persons skilled in the art can think of various examples of changes or modifications within the scope of the technical idea disclosed in the specification, and it will be understood that they naturally belong to the technical scope of contemplated embodiments.

For example, needless to say, each of the above embodiments can be combined to each other. Also, shapes and arrangements of each part are not limited to the examples shown in the drawings. For example, a groove may be formed at least a part of the width-directional position non-restricting section 13 of the optical fiber holding members 1e and 1f to form the non-main pressing section 12.

As above, the pressing member presses the optical fiber ribbon 17 at the width-directional position non-restricting section so that sufficient holding force can be secured.

Also, the width-directional position restricting section is either a non-main pressing section, where the optical fiber ribbon 17 is not strongly pressed, or a non-pressing section, where the optical fiber ribbon 17 is not pressed, so an optical fiber riding over the level difference of the width-directional position restricting section is not strongly pressed. Thus, it is possible to prevent the optical fiber from being pressed excessively.

Also, the pressing member presses the front-end width-directional position restricting section so that shifting of the optical fiber ribbon 17 at the front end can be prevented.

Also, in this case, increasing the height of the front-end width-directional position restricting section higher than the heights of the other width-directional position restricting sections can prevent the optical fibers from riding over the front-end width-directional position restricting section with certainty. Also, forming the cutout section on the lid section facing the front-end width-directional position restricting section can avoid interference of the front-end width-directional position restricting section with the lid section.

Also, by disposing the width-directional position restricting section in the proximity of the front and rear ends of the main body section, the position of a part of the optical fiber ribbon 17 protruding from the main body section can be restricted in its width direction with certainty.

Also, by dividing the pressing member provided at a position facing the width-directional position non-restricting section into a plurality of segments in the axial direction of the optical fiber ribbon 17, the slight bending of the optical fiber at the dividing parts can prevent the optical fiber ribbon 17 from moving in the axial direction. Thus, the holding force for the optical fiber ribbon 17 can be increased.

Also, a plurality of the lid sections are disposed and the pressing member is disposed at each of the lid sections, so, when the optical fiber ribbon 17 protruding from the rear of the main body section 3 is being touched, for example, it is possible to prevent slight movement of the optical fiber ribbon 17 protruding from the front of the main body section.

Also, with the lid section being closed, the height of the width-directional position restricting section above the optical fiber placement surface 15 is higher than the gap between the pressing member and the optical fiber placement surface 15 so as to prevent the optical fiber from riding over the width-directional position restricting section with certainty.

Also, when the groove 21 is formed and the ratio of the depth of the groove 21 to the height of the optical fiber is 0.7 or more, the pressing force applied by the pressing member or the temporarily pressing member to the groove 21 can be reduced.

What is claimed is:

1. An optical fiber holding member comprising:
a main body section on which an optical fiber is to be disposed; and a lid section that can be opened or closed to the main body section, wherein:

the main body section includes, on an optical fiber placement surface thereof:
- a width-directional position restricting section that is parallel to the optical fiber placement surface and restricts a position of the optical fiber in a direction perpendicular to an axial direction thereof; and
- a width-directional position non-restricting section that is parallel to the optical fiber placement surface with a wider width than that of the width-directional position restricting section and does not restrict the position of the optical fiber in the direction perpendicular to the axial direction thereof, a pressing member is formed as a unified body in the proximity of a front end of the lid section such that the pressing member can simultaneously press a front-end width-directional position restricting section, which is the width-directional position restricting section in the proximity of a front end of the main body section, and the width-directional position non-restricting section at the rear of the front-end width-directional position restricting section; and a main pressing section is formed with the pressing member for pressing the optical fiber, the pressing member being disposed on an inner surface of the lid section only at a position facing the width-directional position non-restricting section other than the front-end width-directional position restricting section.

2. The optical fiber holding member according to claim 1, wherein:
- a height of the front-end width-directional position restricting section is higher than heights of the other width-directional position restricting sections; and
- a cutout for avoiding interference with the front-end width-directional position restricting section is formed on the lid section at a position facing the front-end width-directional position restricting section.

3. The optical fiber holding member according to claim 1, wherein:
- the width-directional position restricting sections are formed at least in the proximity of the front and the rear ends of the main body section.

4. The optical fiber holding member according to claim 1, wherein:
- the main pressing section of the pressing member is divided into a plurality of segments in the axial direction of the optical fiber.

5. The optical fiber holding member according to claim 1, wherein:
- a plurality of the lid sections are disposed and a temporarily pressing member that exerts smaller pressing force than the pressing member is disposed on at least one of the lid sections.

6. The optical fiber holding member according to claim 1, wherein:
- with the lid section being closed, heights of some of the width-directional position restricting sections above the optical fiber placement surface are higher than a height of a gap between the pressing member and the optical fiber placement surface.

7. The optical fiber holding member according to claim 1, wherein:
- a part of the width-directional position restricting section is a groove that is formed along a longitudinal direction of the main body section with a ratio of a depth of the groove to a height of the optical fiber being 0.7 or more.

8. A fusion machine comprising:

the optical fiber holding member according to claim 1; and a pair of electrode rods that are provided between a pair of the optical fiber holding members, wherein:

optical fibers held in the optical fiber holding members can be fusion spliced by generating arc between the pair of the electrode rods.

* * * * *